United States Patent [19]

Bolgiano et al.

[11] 4,211,938
[45] Jul. 8, 1980

[54] TONE DETECTOR

[75] Inventors: Duane R. Bolgiano, Bala Cynwyd; Joel M. Benjamin, Jr., Pottstown; Victor Meyer, Jr., Telford, all of Pa.

[73] Assignee: International Mobile Machines Incorporated, Bala Cynwyd, Pa.

[21] Appl. No.: 951,734

[22] Filed: Oct. 16, 1978

Related U.S. Application Data

[62] Division of Ser. No. 755,615, Dec. 29, 1976, Pat. No. 4,130,731.

[51] Int. Cl.$^2$ ........................ H03K 9/06; H03K 17/28
[52] U.S. Cl. ............................... 307/233 R; 328/138; 307/246; 307/293
[58] Field of Search ................... 307/233 R, 246, 293; 328/138

[56] References Cited

U.S. PATENT DOCUMENTS

| | | | |
|---|---|---|---|
| 2,969,468 | 1/1961 | Hogue | 307/233 X |
| 3,173,065 | 3/1965 | Fullerton | 307/233 X |
| 3,204,190 | 8/1965 | Broadhead | 307/233 X |

Primary Examiner—John S. Heyman
Attorney, Agent, or Firm—Arthur A. Jacobs

[57] ABSTRACT

A tone detector comprising a non-linear or saturated system that is adapted to receive an input frequency or group of frequencies and to provide an output in the form of turn-on and turn-off signals which are independent of the amplitude of the input, the turn-on and turn-off signals being determined by the presence or absence of a particular frequency or group of frequencies; the system including a transistor connected to a biasing network that is DC referenced to a supply voltage potential of the collector of the transistor and AC referenced to the emitter of the transistor, and a filter connected to the transistor, the filter being substitutable by an input coupling capacitor to determine the presence or absence of the particular frequency or frequencies.

5 Claims, 2 Drawing Figures

TONE DETECTOR

This application is a division of application Ser. No. 755,615, filed Dec. 29, 1976; now issued as U.S. Pat. No. 4,130,731, dated Dec. 19, 1978.

This invention relates to a tone detector which is utilizable in various systems, as for example, in a portable telephone system having a base station and various subscriber stations.

When used in a portable telephone system of the aforesaid type, the tone detector is connected to the receiver of the system, and this tone detector controls a threshold detector which controls a multi-channel scanner, whereby, if the base station transmits certain tones on a particular channel while the receiver is turned on and tuned to that channel, such tones are detected by the tone detector, the output thereof controlling a monostable having a predetermined time period, which is adapted to terminate the scanning for a predetermined time period. If, during this time period, the base station should transmit tones, the receiver will remain tuned to the same channel for the predetermined period after the base station stops repeating the transmission of the tones.

Heretofore, tone detector systems generally utilized a non-linear, or saturated, system wherein the actuating signals forming the output are dependent on the amplitude of the incoming signals. This limits the system in that it makes the output proportional to the input.

Another disadvantage of most prior systems is that they require the use of transformers or the like, which makes the system unduly complicated and expensive.

It is, therefore, an object of this invention to provide a tone detector which provides an output that is independent of the amplitude of the input frequency.

Another object of the present invention is to provide a tone detector of the aforesaid type that operates to turn on or turn off a threshold detector independently of the amplitude of the input signal.

Another object of this invention is to provide a tone detector of the aforesaid type which is relatively inexpensive and simple in construction.

Other objects and many of the attendant advantages of this invention will be readily appreciated as the same becomes better understood by reference to the following description when read in conjunction with the accompanying drawing wherein.

Figure 1:
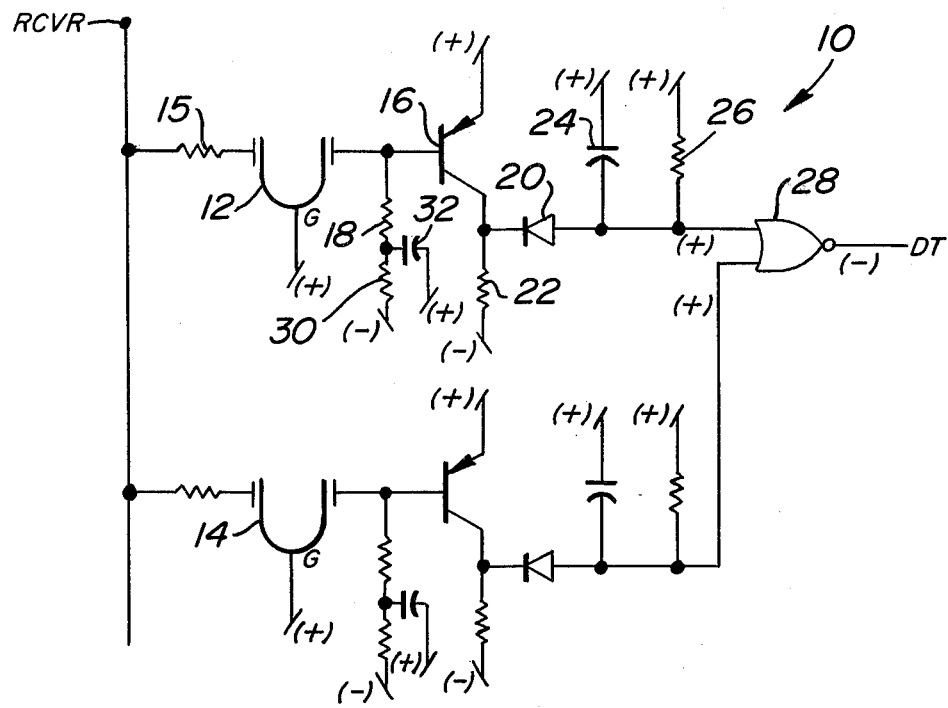
FIG. 1 is a schematic view of a tone detector embodying the present invention.

In essence, the tone detector of the present invention comprises a transistor connected to a biasing network that is DC referenced to the supply voltage potential of the collector of the transistor and AC referenced to its emitter. It also includes a filter connected to the transistor, which may be substituted by an input coupling capacitor to permit the detector to determine the presence or absence of a particular frequency or group of frequencies. The collector of the transistor is connected to the cathode of a diode whose anode is connected to the junction of a capacitor and a resistor, the opposite ends of the capacitor and resistor being connected to the emitter of the transistor. The aforesaid junction is also connected to the input of a threshold detector.

Referring in greater detail to the drawing, the tone detector system, generally designated 10, comprises electrically-excited crystal and tuning fork resonators 12 and 14, which are connected to the receiver RCVR via a resistor 15, plus their associated components. Since the resonators 12 and 14 and their associated components are identical, a description of one will serve as a description of the other.

Connected to the resonator 12 is a transistor 16 which is lightly biased on by resistor 18. A diode 20 is connected between the collector of the transistor and a pulldown resistor 22, the diode also serving to couple a capacitor 24 and a parallel resistor 26 to the collector. The capacitor 24 and resistor 26 are also connected to a NOR gate 28. A decoupling network, including resistor 30 and capacitor 32, is connected to the resistor 18.

In operation, when the signal transmitted through resistor 15 does not contain a frequency or group of frequencies that corresponds to the resonant frequency of the resonator 12, the transistor 16 is conductive, reverse biasing the diode 20. This causes the capacitor 24 to discharge through resistor 26, thereby turning off the gate 28. If the signal contains a frequency or group of frequencies that corresponds to the resonant frequency of the resonator 12, the transistor 16 becomes nonconductive, whereby the diode is caused to conduct, charging the capacitor 24, while the gate 28 is turned on via the resistor 22. The use of these two independent resistors results in the turn-on time and the turn-off time being independently determined. This arrangement also makes the turn-on and turn-off signals independent of the amplitude of the input signal.

The receiver contains a phase-locked loop, the error voltage of which is essentially constant but of indeterminate amplitude when a carrier is present within the pass band of the receiver. When no carrier is present, the error voltage is either oscillatory or consists of noise.

Figure 2:
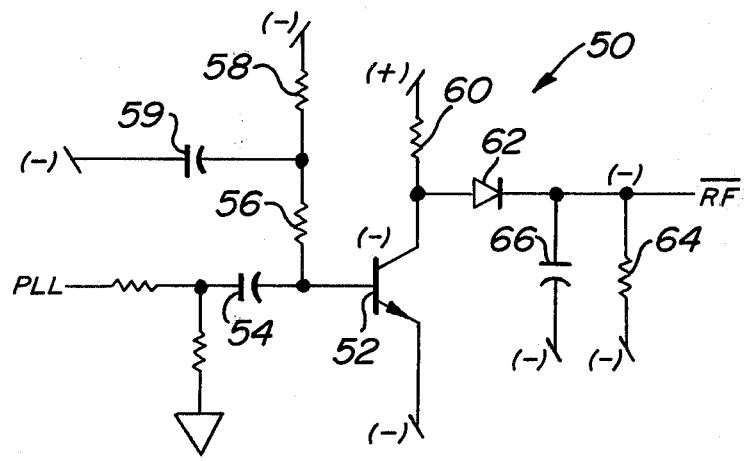
FIG. 2 is a schematic view of a second embodiment of the present invention.

FIG. 2 discloses the same general type of tone detector network as described above with regard to FIG. 1. In this respect, the network, generally designated 50, comprises a transistor 52 and its associated components, which operates in substantially the same manner as transistor 16 and its associated components, described above; however, capacitor 54 is added so that if a carrier is present, only DC current is present on the line PLL. Transistor 52 is lightly biased by the resistors 56 and 58 of the decoupling network, which includes capacitor 59; these decoupling resistors also acting to charge the capacitor 54. A resistor 60 acts as a pullup load resistor for the transistor 52. The diode 62, resistor 64 and capacitor 66 serve the same purposes as diode 20, resistor 22 and capacitor 24 in FIG. 1.

The bias makes the line RF negative. If a carrier is not present, then the oscillations or noise on line PLL are passed by capacitor 54 and reproduced as saturated signals on the collector of transistor 24 so that line RF becomes positive.

The invention claimed is:

1. A non-linear tone detector system comprising:
   receiving means sensitive to at least one input frequency;
   output means for providing an output in the form of turn-on and turn-off signals;
   control means for controlling the output of said output means;
   said control means being adapted to turn off the output means in the absence of a particular frequency or group of frequencies at said receiving means after a predetermined time period, and to turn on said output means after a predetermined time period in the presence of a particular frequency or group of frequencies at said receiving means;

said time periods being determined by independent actuating means.

2. The system of claim 1 wherein said independent actuating means are two independent resistors connected to a common capacitor and to said output means by a common junction.

3. The system of claim 2 wherein said control means is a transistor which is connected to said capacitor via a diode coupling means.

4. The system of claim 3 wherein said transistor has a biasing network that is DC referenced to the supply voltage potential of its collector and AC referenced to its emitter.

5. The system of claim 1 wherein said output means is an electrical gate.

* * * * *